Patented May 30, 1944

2,349,836

UNITED STATES PATENT OFFICE 2,349,836

PROCESS FOR THE CURING AND PRESERVATION OF ANIMAL AND FISH PRODUCTS

Leander S. Stuart, Bethesda, Md., assignor to Claude R. Wickard, as Secretary of Agriculture of the United States of America, and to his successors in office No Drawing. Application May 11, 1942, Serial No. 442,556

8 Claims. (Cl. 99—159)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to an improved process for the curing and preservation of animal and fish products with materials of non-toxic characteristics from the standpoint of human consumption.

This invention relates, in particular, to the preservation of hides, skins, animal intestine casings, and the like commonly preserved by the application of salt (sodium chloride) or concentrated salt brines.

Among the present practices of curing raw hides, meat, casings, fish, and the like, they are covered with salt (sodium chloride), or are immersed in strong salt brines. They may then be placed in packs, piles, bundles, kegs, boxes, or barrels, with or without excess salt, for storage or shipment prior to use. When salt is applied directly to the fresh material it is said to be "green salt cured." When the products are immersed in strong brine they are said to be "brine cured."

The use of common salt (sodium chloride) alone for curing and preserving protogenous materials, such as skins, fish, animal intestines, and the like, has certain disadvantages that are now well recognized in the art. Salt is not an ideal preservative except under conditions of partial dehydration not easily attainable, since some types of microorganisms, and especially the salt-tolerant and halophilic bacteria, will grow in its presence bringing about putrefaction, rancidity, and spoilage. To overcome this deficiency, the mixing with salt of numerous preservative agents, antiseptics, and disinfectants has been proposed. Heretofore, the chemicals having properties of a bacteriostatic or germicidal nature that have been suggested for use in this connection would tend to render the product unfit for use as food or for use in connection with the manufacture of food products, either through the impartation of obnoxious odors or flavors, or of toxic characteristics. Thus, the use of such materials with salt has been highly restricted. Even where it is known that the product will not eventually be used in the manufacture of edible products, there is a hazard in handling materials possessing obnoxious odors or toxic characteristics in or around an establishment where the primary product is meat or fish intended for human consumption. This tends to rule against their use.

In accordance with this invention, hides, skins, animal intestines, meat, dressed fish, and the like, soon after the slaughter of the animal or fish and while still in a fresh condition, are subjected to a curing compound consisting of a mixture of salt (sodium chloride) with small quantities of one or more chemicals that are non-toxic to humans in the concentrations employed and are devoid of obnoxious flavors and odors.

These chemicals can be designated in general as belonging to two groups: (1) the monohalide derivatives of the aliphatic acids and their alkali salts, and (2) para-aminobenzoic acid and its alkyl esters. The former are water soluble. The latter are relatively insoluble in water but are quite soluble in glycerine, various glycols, and natural fats and oils. According to this invention these compounds have been found to exert a strong preservative action on hides, skins, animal intestines, meat, dressed fish, and the like, when applied admixed with salt.

Example I

Pieces of freshly flayed calfskin were salted on the flesh side with one-third of their weight of salt alone, salt mixed with 1 percent of its weight of monochloracetic acid, salt mixed with 1 percent of its weight of sodium monochloracetate, salt mixed with 0.5 percent of its weight of ethyl para-aminobenzoate, and salt mixed with a combination of 1 percent of its weight of sodium monochloracetate and 0.5 percent of its weight of ethyl para-aminobenzoate, respectively. Immediately after salting, each lot was piled flesh side up in a humid chamber over water and incubated at 30° C. for 6 weeks. At the end of this incubation period the pieces salted with sodium chloride alone had a strong ammoniacal, putrid odor. They were discolored on the flesh and the hair could be easily slipped or rubbed off. Large amounts of soluble nitrogenous products resulting from the decomposition of proteins had accumulated. In contrast thereto, those pieces of calfskin salted with salt to which the enumerated chemicals had been added in the quantities specified were all in an excellent state of preservation. In all instances, the hair was tight. There was no evidence of marked putrefaction or flesh discoloration. On the basis of bacterial count and increase in soluble nitrogenous products of protein decomposition, the pieces salted with salt containing 1 percent sodium monochloracetate and 0.5 percent ethyl para-aminobenzoate appeared to be slightly better preserved than pieces salted with salt containing 1 percent monochloracetic acid or 1 percent sodium monochloracetate, or 0.5 percent ethyl para-aminobenzoate. Similar tests have been conducted using methyl para-aminobenzoate, monoiodoacetic acid, monobromacetic acid, monobrompropionic acid, sodium monoiodoacetate, sodium monobromacetate, and sodium monobrompropionate. In all cases there was a marked preservative effect.

Example II

Fillet of haddock was cut into pieces 3½ inches square. Two pieces were salted on the flesh side with 40 percent of their weight of a crude solar salt, known to be heavily contaminated with red, chromogenic halophilic bacteria. Two similar pieces were salted at the same time on the flesh with 40 percent of their weight of the same salt previously mixed with 1 percent of its weight of sodium monochloracetate plus 0.5 percent of its weight of ethyl para-aminobenzoate. All pieces were incubated over water at 30° C. for 8 weeks. At the conclusion of this incubation period those pieces salted with salt alone had reddened on the flesh. They had a strong ammoniacal odor and were definitely in an advanced stage of decomposition. In contrast thereto, those pieces salted with the same salt with which ethyl para-aminobenzoate and sodium monochloracetate had been mixed were free from flesh reddening. They did not have a strong ammoniacal odor and were well preserved.

Example III

Rabbit intestines were washed free of their contents with water. One screw-capped jar was packed with washed intestines and dry salt; one with washed intestines and dry salt containing 1 percent sodium monochloracetate; one with washed intestines and dry salt containing 0.5 percent ethyl para-aminobenzoate; and one with washed intestines and dry salt containing both 1 percent sodium monochloracetate and 0.5 percent ethyl para-aminobenzoate. In all cases salt was added equal to 50 percent of the weight of the intestines. Immediately after salting, the tops of the jars were screwed on and the jars placed in an incubator at 30° C. for 8 weeks. At the conclusion of the incubation period the intestines salted with salt alone had a strong, rancid, butyric odor, whereas, those salted with salt to which the aforementioned chemicals had been added had a clean, fresh odor.

According to a preferred modification of my invention, sodium monochloracetate and ethyl para-aminobenzoate are thoroughly mixed with the salt in amounts of 1 percent and 0.5 percent, respectively, on the weight of the salt, and the mixture applied to hides, skins, fish, animal intestines, and the like, in the same manner as for curing by "green salting." However, other proportions of the preservative chemicals, or other chemicals of the groups represented in the preferred modifications, i. e., the monohalide derivatives of the aliphatic acids and their alkali salts, or the alkyl esters of para-aminobenzoic acid may be used, either alone or in various combinations. Use may be made by means or methods other than that of direct application with dry salt as in "green salting." These may include the use alone of solutions of various concentrations of the water soluble monohalide derivatives of the aliphatic acids and their alkali salts, or a solution of ordinary salt containing the soluble acids or their salts. It may also include the use alone of an alkyl ester of para-aminobenzoic acid in any suitable solvent, such as glycerine or various glycols, or a water solution, or an ordinary salt solution containing an alkyl ester of para-aminobenzoic acid dissolved therein through the use of a miscible solvent. Likewise, it may include application in mixtures either in water or ordinary salt solutions of two or more substances which may be designated as either a monohalide derivative of an aliphatic acid, an alkali salt of a monohalide derivative of an aliphatic acid, or an alkyl ester of para-aminobenzoic acid.

Having thus described my invention, what I claim for Letters Patent is:

I claim:

1. A method for curing and preserving animal and fish products, which comprises subjecting them to the action of an alkyl ester of para-aminobenzoic acid and at least one member selected from the group consisting of monohalide derivatives of aliphatic acids other than fluorine derivatives and alkali salts of said monohalide derivatives.

2. A method for curing and preserving animal and fish products, which comprises subjecting them to the action of an alkyl ester of para-aminobenzoic acid, of sodium chloride and at least one member selected from the group consisting of monohalide derivatives of aliphatic acids other than fluorine derivatives and alkali salts of said monohalide derivatives.

3. A method for curing and preserving animal and fish products, which comprises subjecting them to the action of an alkyl ester of para-aminobenzoic acid and sodium chloride brines containing at least one member selected from the group consisting of monohalide derivatives of aliphatic acids other than fluorine derivatives and alkali salts of said monohalide derivatives.

4. An animal and fish products curative and preservative comprising an alkyl ester of para-aminobenzoic acid and sodium chloride mixed with at least one member chosen from the group consisting of monohalide derivatives of aliphatic acids other than fluorine derivatives and alkali salts of said monohalide derivatives.

5. The method of curing and preserving animal and fish products comprising subjecting the product to the action of an alkyl ester of para-aminobenzoic acid and at least one member selected from the group consisting of monochloro, monobromo, and monoiodo derivatives of aliphatic acids and alkali salts of said derivatives.

6. The method of curing and preserving animal and fish products comprising subjecting the product to the action of an alkyl ester of para-aminobenzoic acid.

7. The method of curing and preserving animal and fish products comprising subjecting the product to the action of monohalide derivatives of aliphatic acids other than fluorine derivatives in combination with alkali salts of said monohalide derivatives.

8. The method of curing and preserving animal and fish products comprising subjecting the product to the action of monohalide derivatives of aliphatic acids other than fluorine derivatives.

LEANDER S. STUART.